United States Patent
Smith et al.

[11] Patent Number: 6,082,533
[45] Date of Patent: Jul. 4, 2000

[54] CONTACT LENS PACKAGE

[75] Inventors: David L. Smith, Rochester; Allen L. Ormiston, Fairport, both of N.Y.

[73] Assignee: Bausch & Lomb Incorporated, Rochester, N.Y.

[21] Appl. No.: 09/211,764

[22] Filed: Dec. 15, 1998

[51] Int. Cl.[7] .................................................. B65D 85/38
[52] U.S. Cl. .......................................... 206/210; 206/5.1
[58] Field of Search ........................ 206/5.1, 461, 469, 206/470, 538, 210; 220/359.1, 359.2, 359.3, 359.4

[56] References Cited

U.S. PATENT DOCUMENTS

| | | | |
|---|---|---|---|
| 160,286 | 3/1875 | Shaw | 220/359.1 |
| 4,605,142 | 8/1986 | Itoh et al. | 220/359.4 |
| 4,691,820 | 9/1987 | Martinez | 206/205 |
| 5,036,971 | 8/1991 | Seden et al. | 206/5.1 |
| 5,143,660 | 9/1992 | Hamilton et al. | 264/1.4 |
| 5,407,062 | 4/1995 | Shannon et al. | 206/5.1 |
| 5,467,868 | 11/1995 | Abrams et al. | 206/5.1 |
| 5,524,419 | 6/1996 | Shannon | 53/431 |
| 5,573,108 | 11/1996 | Hamilton et al. | 206/5.1 |
| 5,578,331 | 11/1996 | Martin et al. | 425/445 |
| 5,649,410 | 7/1997 | Martin et al. | 53/474 |
| 5,704,468 | 1/1998 | Lust et al. | 206/5.1 |
| 5,722,536 | 3/1998 | Pierce et al. | 206/5.1 |
| 5,823,327 | 10/1998 | Wu et al. | 206/5.1 |
| 5,833,071 | 11/1998 | Ray | 206/469 |

*Primary Examiner*—Jim Foster
*Attorney, Agent, or Firm*—John E. Thomas

[57] ABSTRACT

A contact lens package has a raised surface with an arcuate cross-section surrounding a well which holds a contact lens and solution. A flexible lidstock is removably sealed to the raised surface.

3 Claims, 3 Drawing Sheets

CONTACT LENS PACKAGE

BACKGROUND OF THE INVENTION

The present invention relates to contact lens packages, and in particular to disposable contact lens packages commonly referred to as blister packages.

Soft hydrogel contact lenses have been increasing in popularity ever since they were first introduced in the 1970's. Such contact lenses are conventionally packaged in the hydrated state and in a storage solution. Currently, many contact lenses are packaged, along with the aqueous storage solution, in a disposable plastic blister package. Examples of blister packages can be seen in U.S. Pat. Nos. 4,691,820; 5,524,419; 5,578,331, 5,649,410 and 5,722,536, the entire disclosures of which are incorporated herein by reference. The base of a blister package can either be part of the original contact lens mold or a separately molded base. Examples of packages using the mold as part of the package can be seen in U.S. Pat. Nos. 5,036,971; 5,143,660; 5,407,062 and 5,573,108, the entire disclosures of which are incorporated herein by reference. In all of the above mentioned package types, the base that contains the contact lens and any aqueous storage solution, whether it is a separated molded base or part of the original contact lens mold, is sealed by a flexible lidstock. This lidstock is typically a laminated foil which can be pulled back by a user to access the lens contained in the base. Typically, this lidstock is sealed to the area surrounding the portion of the base containing the contact lens. This sealing area of the base has typically been a flat surface area, or a raised flattened annular surface as seen, for example, in U.S. Pat. No. 5,722,536. However, it has been found that this flat surface, whether raised or not, can pose problems during the sealing process. If a molding s process is used to form the blister package, for example, the material may have some shrinkage, resulting in somewhat concave sealing surface. Any low spots or unevenness of the sealing surface can additionally cause microbubbles and result in a poor seal. Storage solution used to keep the contact lens hydrated can inadvertently spill and then remain on the sealing area; this can lead to a poor seal between the lidstock and the package base.

Accordingly, it is an object of the present invention to provide a package for contact lenses that includes an improved sealing area on the base of contact lens package.

SUMMARY OF THE INVENTION

This invention provides an improved contact lens package that comprises a base and a recessed well within the base for containing a contact lens, wherein the base comprises a raised surface with an arcuate cross-section surrounding the recessed well. A lidstock is removably sealed to the base at this raised surface.

DETAILED DESCRIPTION OF THE INVENTION

Figure 1:
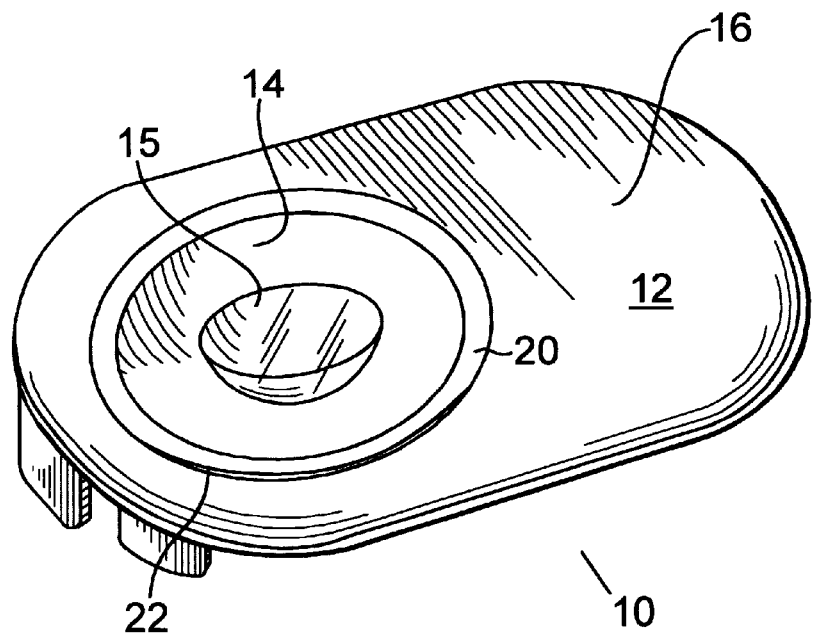
FIG. 1 is a top perspective view of a prior art contact lens package.

Referring to the drawing, FIG. 1 shows an embodiment of one type of disposable plastic blister package used for packaging a contact lens. More specifically, as seen in FIG. 1, package 10 generally comprises support base 12 with concave recessed well area 14 for receiving and holding contact lens 5 therein. Generally, the contact lens will be packaged along with an aqueous storage fluid, such as buffered saline solution, in well area 14. Package 10 may be molded from a material such as polypropylene. Base 12 includes a substantially planar top surface 16 and a raised annular surface 20 encircling the periphery of well area 14. While raised surface 20 is shown to be ring-shaped, other embodiments are known, for example, another possible embodiment may include a chevron-shaped raised annular surface surrounding the well.

Figure 2:
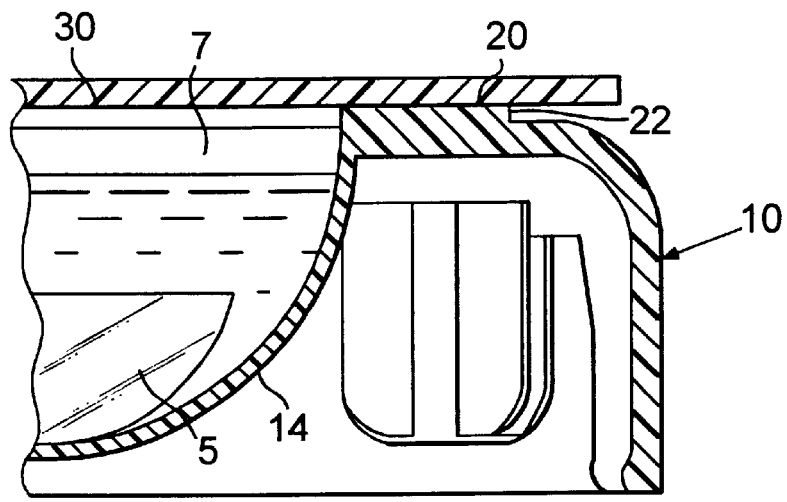
FIG. 2 is an enlarged view of the sealing area of the package of FIG. 1.

As seen in FIG. 2, outer wall 22 forms a substantially right degree angle with respect to raised surface 20. Once contact lens 5 has been deposited in well 14 with a quantity of aqueous storage fluid 7, lidstock 30 is applied, so as to cover substantially the entire top surface 16, by heat-sealing the lidstock about annular surface 20, thereby hermetically sealing lens 5 in well 14 of package 10. It is noted that raised surface 20 is a flat annular surface as illustrated in FIG. 2.

The first illustrated embodiment of this invention is based on a lens package similar to that shown in FIG. 1. However, instead of a flat annular surface 20 surrounding the well area, package 200 of FIG. 3 includes raised annular surface 210 surrounding the periphery of well 214 and having a generally arcuate cross-sectional shape.

Raised surface 210 is defined by wall 220 that extends substantially perpendicularly from top surface 160 of the base, terminating at edge 240, and curved surface 260. It is noted that wall 220 does not need to be exactly perpendicular to top surface 160, for example, in the embodiment shown in FIG. 3, the angle formed between wall 220 and surface 160 may be greater than or equal to 90 degrees.

Figure 3:
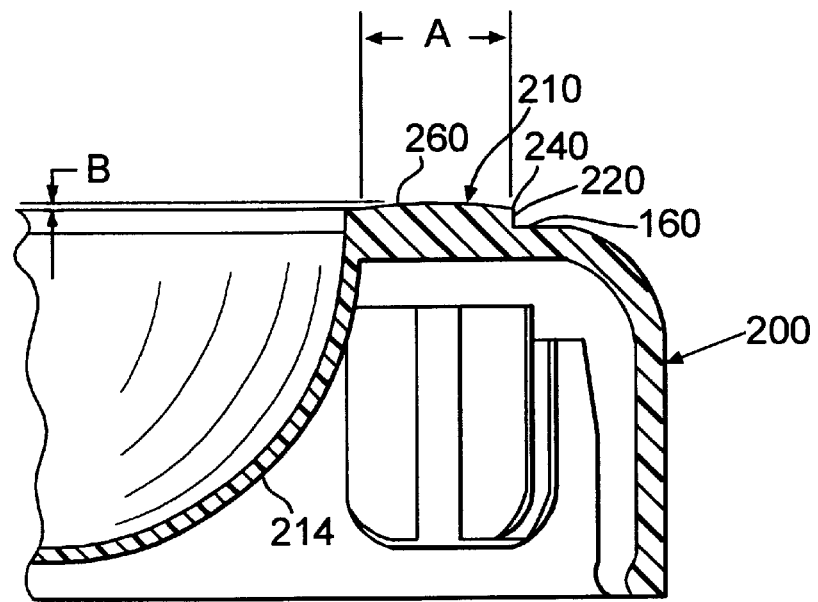
FIG. 3 shows an enlarged view of the raised sealing area according to an embodiment of this invention, the package otherwise being analogous to the package shown in FIG. 1.

In the embodiment illustrated in FIG. 3, the cross-section of curved surface 260 has a radius of about 12.5 mm. The radius of this curved surface is not particularly critical, provided that a proper width and height of curved surface 260 is selected. More specifically, since lidstock is sealed to surface 260, surface 260 should have sufficient width A to effect an adequate heat seal with lidstock applied thereto. Accordingly, surface 260 should have a width A of at least 2.5 mm. Additionally, surface 260 should have adequate height (i.e., the apex at the highest point of surface 260 in relation to edge 240) such that if any aqueous fluid spills on surface 260, it will not pool on this surface. Accordingly, a preferred height B of surface 260 in relation to edge 240 is at least 0.05 mm, more preferably about 0.060 to about 0.100 mm.

Figure 4:
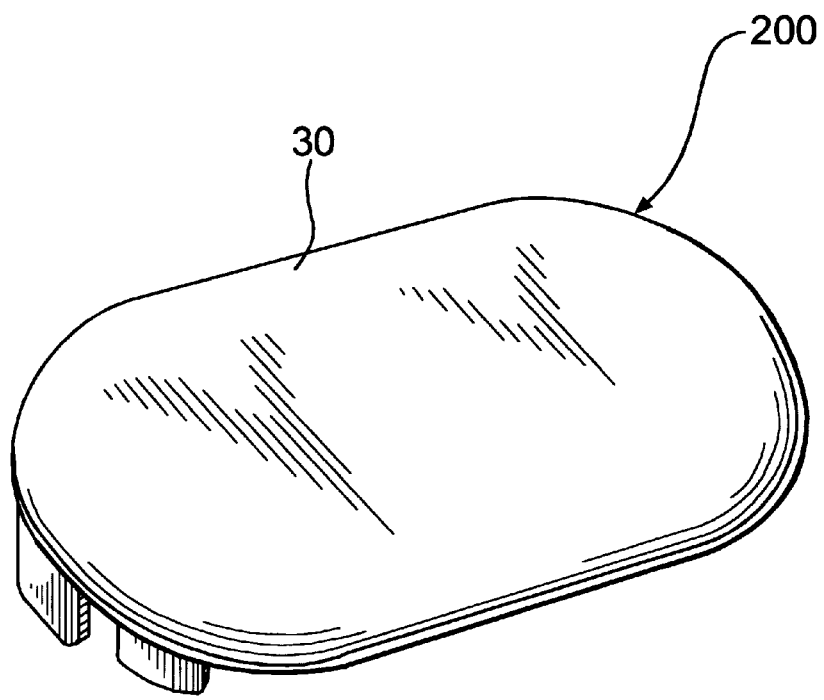
FIG. 4 is a top perspective view of an embodiment of this invention with lidstock.

FIG. 4 shows the first embodiment of this invention sealed with lidstock 30.

Figure 5:
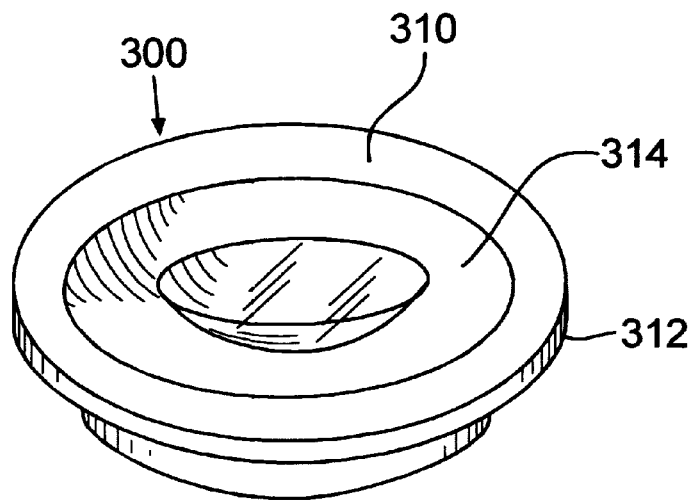
FIG. 5 is a top perspective view of an alternate embodiment.
Figure 6:
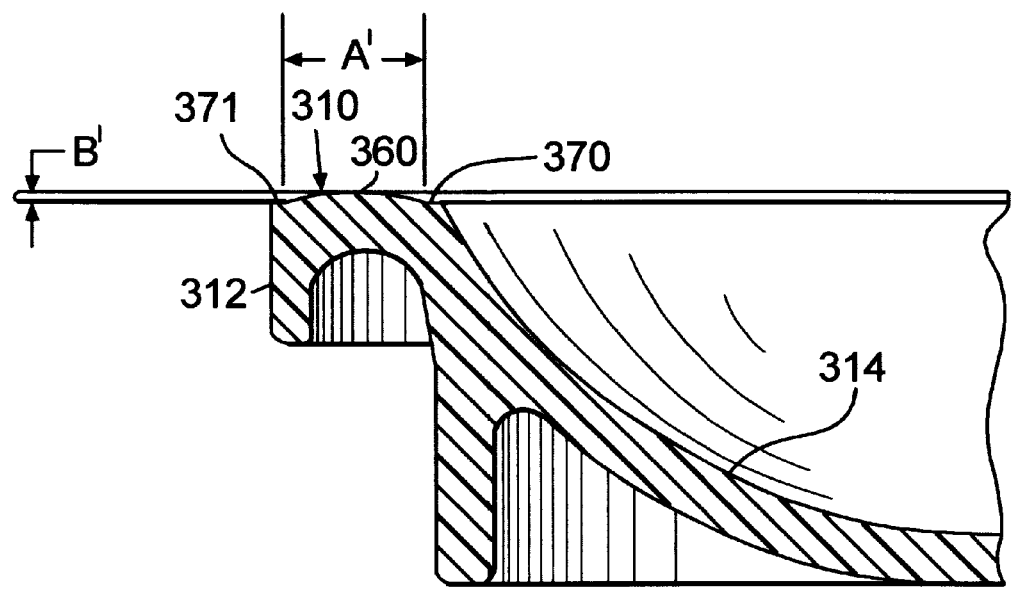
FIG. 6 is an enlarged sectional view of the sealing area of the package of FIG. 5.

A second embodiment 300 of this invention is illustrated in FIGS. 5 and 6. In this package, raised surface 310 of base 312 has an arcuate cross-sectional shape and surrounds well area 314. Raised surface 310 is defined by curved surface 360 and flat surfaces 370, 371 which circumferentially surround curved surface 360 on its outer and inner edges, respectively. For the illustrated embodiment, flat areas 370, 371 are each about 0.2 mm in width. Surface 360 has a width A' of at least 2.5 mm and maximum height B' in relation to surfaces 370,371 of at least 0.05 mm, more preferably about 0.1 to 0.3 mm for this embodiment.

For each of the embodiments, as previously mentioned, a contact lens is placed in the well and aqueous storage fluid is added thereto. A lidstock is removably sealed to the raised surface with the arcuate cross-sectional shape, by heat sealing for example, to seal the lens and storage fluid in the well. An advantage of the arcuately shaped raised portion is that if any aqueous solution is applied to the curved surface of this raised portion, the solution is less likely to pool on this surface, thereby avoiding a poor seal between the lidstock and this curved surface.

Many other modifications and variations of the present invention are possible to one skilled in the field in the field in light of the teachings herein. It is therefore understood that, within the scope of the claims, the present invention can be practiced other than as herein specifically described.

We claim:

1. A contact lens package for holding a contact lens in an aqueous solution comprising:

a) a base having a top surface and a recessed well having a perimeter in the top surface for holding a contact lens in aqueous solution therein, said top surface comprising a raised surface surrounding and radially contiguous with said perimeter of said recessed well said raised surface having an arcuate cross-sectional shape which is operable to deflect any of said aqueous solution coming into contact with said raised surface; and b) a removable lidstock sealed to said raised surface including substantially all of said arcuate cross-sectional shape thereof.

2. The contact lens package of claim 1, further comprising a contact lens and an aqueous solution contained in the recessed well area.

3. The contact lens package of claim 1, wherein an upper curved surface of the raised portion has a width of at least 2.5 mm.

* * * * *